(12) United States Patent
Yamazaki et al.

(10) Patent No.: US 12,715,703 B2
(45) Date of Patent: Aug. 25, 2026

(54) BULK FEEDER AND FEEDER MANAGEMENT DEVICE

(71) Applicant: FUJI CORPORATION, Chiryu (JP)

(72) Inventors: Yusuke Yamazaki, Chiryu (JP); Toru Takahama, Toyohashi (JP)

(73) Assignee: FUJI CORPORATION, Chiryu (JP)

(*) Notice: Subject to any disclaimer, the term of this patent is extended or adjusted under 35 U.S.C. 154(b) by 515 days.

(21) Appl. No.: 18/261,939

(22) PCT Filed: Jan. 29, 2021

(86) PCT No.: PCT/JP2021/003422

§ 371 (c)(1),
(2) Date: Jul. 18, 2023

(87) PCT Pub. No.: WO2022/162917

PCT Pub. Date: Aug. 4, 2022

(65) Prior Publication Data

US 2024/0067453 A1 Feb. 29, 2024

(51) Int. Cl.
*B65G 27/08* (2006.01)
*B65G 43/00* (2006.01)

(52) U.S. Cl.
CPC ............. *B65G 27/08* (2013.01); *B65G 43/00* (2013.01)

(58) Field of Classification Search
CPC ........ B65G 27/08; B65G 43/00; B65G 27/18; B65G 27/26; B65G 43/02; B65G 47/145;
(Continued)

(56) References Cited

U.S. PATENT DOCUMENTS 3,760,484 A * 9/1973 Kowalski ........... H05K 13/0053 221/12
4,917,561 A * 4/1990 Biesecker ............ H05K 13/021 221/106
(Continued)

FOREIGN PATENT DOCUMENTS

DE 10 2013 219 473 A1 3/2015
EP 2 011 751 A2 1/2009
(Continued)

OTHER PUBLICATIONS

International Search Report mailed on Apr. 13, 2021 in PCT/JP2021/003422 filed on Jan. 29, 2021, 3 pages.

*Primary Examiner* — Patrick H Mackey
(74) *Attorney, Agent, or Firm* — Oblon, McClelland, Maier & Neustadt, L.L.P.

(57) ABSTRACT

A bulk feeder includes a feeder main body, a bracket provided to be vibratable with respect to the feeder main body, a track member provided detachably with respect to the bracket, an excitation device configured to apply vibration to the track member via the bracket, a locking target member provided in a first one of the track member and the bracket, and a lock member provided in a second one of the track member and the bracket and configured to switch between a locked state in which the lock member is locked to the locking target member to restrict a relative movement of the track member with respect to the bracket, and a released state in which lock between the lock member and the locking target member is released.

10 Claims, 5 Drawing Sheets

(58) Field of Classification Search
CPC .... B65G 27/34; H05K 13/028; H05K 13/043; H05K 13/021
See application file for complete search history.

(56) References Cited

U.S. PATENT DOCUMENTS

| | | | | |
|---|---|---|---|---|
| 6,382,396 | B1 * | 5/2002 | Dana | B61B 10/025 198/465.4 |
| 7,997,403 | B2 * | 8/2011 | Larsson | B65G 25/04 198/771 |
| 8,234,779 | B2 * | 8/2012 | Larsson | H05K 13/028 29/760 |
| 12,376,273 | B2 * | 7/2025 | Yamazaki | H05K 13/043 |
| 2009/0008221 | A1 | 1/2009 | Boeger et al. | |
| 2023/0132218 | A1 * | 4/2023 | Shimizu | H05K 13/0084 206/701 |
| 2023/0337409 | A1 * | 10/2023 | Takata | H05K 13/0408 |

FOREIGN PATENT DOCUMENTS

| | | | | |
|---|---|---|---|---|
| JP | 2010067907 | A | * | 3/2010 |
| JP | 2011-114084 | A | | 6/2011 |

* cited by examiner 30
35
621
621B
621A
60
61(61A)
622
(622B)
61(61B)
63
62
63
622
(622A)
624
625
624
625
65
64
641
624
625
624
625
34
626

30
35
621
621B
621A
60
61(61A)
622
(622B)
61(61B)
63
62
63
622
(622A)
64
64
625
624
625
64
65
626
64
641
625
624
625
624
34
624

BULK FEEDER AND FEEDER MANAGEMENT DEVICE

TECHNICAL FIELD

The present disclosure relates to a bulk feeder and a feeder management device.

BACKGROUND ART

A bulk feeder is provided in a component mounter for mounting a component on a substrate, and is used for supplying the component in a bulk state. The bulk feeder conveys multiple components discharged from a component case, and supplies the components in a supply region opened upward so that a suction nozzle can collect the components. Patent Literature 1 discloses a configuration for applying vibration to a conveyance path to convey multiple components.

PATENT LITERATURE

Patent Literature 1: JP-A-2011-114084

BRIEF SUMMARY

Technical Problem

In such a bulk feeder, an attachable; detachable type may be adopted for a track member having a conveyance path or a supply region formed thereon from the viewpoint of improving maintainability. However, since the track member is a member to be vibrated by an excitation device, it is required to be surely locked, and as a result, it takes time to attach or detach the track member. In addition, the bulk feeder is required to prevent the occurrence of an operation failure caused by the unsuitable locking of the track member.

An object of the present specification is to provide a bulk feeder capable of improving exchangeability of a track member by simplifying an attachment/detachment operation of the track member, and to provide a feeder management device capable of detecting that lock of the track member is unsuitable and preventing occurrence of an operation failure.

Solution to Problem

According to the present specification, there is provided a bulk feeder including: a feeder main body; a bracket provided to be vibratable with respect to the feeder main body; a track member provided detachably with respect to the bracket and formed with a conveyance path through which multiple components are conveyed and a supply region that communicates with the conveyance path and opens upward to collect the multiple components; an excitation device configured to apply vibration to the track member via the bracket so that the multiple components are conveyed along the conveyance path; a locking target member provided in a first one of the track member and the bracket; and a lock member provided in a second one of the track member and the bracket and configured to switch between a locked state in which the lock member is locked to the locking target member to restrict a relative movement of the track member with respect to the bracket, and a released state in which lock between the lock member and the locking target member is released.

According to the present specification, there is provided a feeder management device for a bulk feeder, in which the bulk feeder includes a feeder main body, a bracket provided to be vibratable with respect to the feeder main body, a track member provided detachably with respect to the bracket and formed with a conveyance path through which multiple components are conveyed and a supply region that communicates with the conveyance path and opens upward to collect the multiple components, and an excitation device configured to apply vibration to the track member via the bracket so that the multiple components are conveyed along the conveyance path, the feeder management device including a measurement section configured to measure a frequency or an amplitude of vibration of the bracket when the excitation device excites the track member; and a lock determination section configured to determine whether lock of the track member with respect to the bracket is suitable based on a result measured by the measurement section.

Advantageous Effects

According to such a configuration of the bulk feeder, an attachment/detachment operation of the track member can be simplified by switching the lock member between a locked state and a released state of the track member with respect to the bracket. Accordingly, it is possible to improve exchangeability of the track member.

According to the configuration of such a feeder management device, it is possible to detect that lock of the track member is unsuitable based on an actual vibration characteristic (frequency or amplitude) of the bracket to which the track member is attached. Accordingly, it is possible to prevent occurrence of an operation failure caused by unsuitable locking of the track member.

DESCRIPTION OF EMBODIMENTS

1. Configuration of Component Mounter 10

Component mounter 10 makes up a production line for producing a substrate product together with multiple types of substrate working machines including, for example, another component mounter 10. The substrate working machine making up the production line described above can include a printer, an inspection device, a reflow furnace, and the like.

1-1. Substrate Conveyance Device

Figure 1:
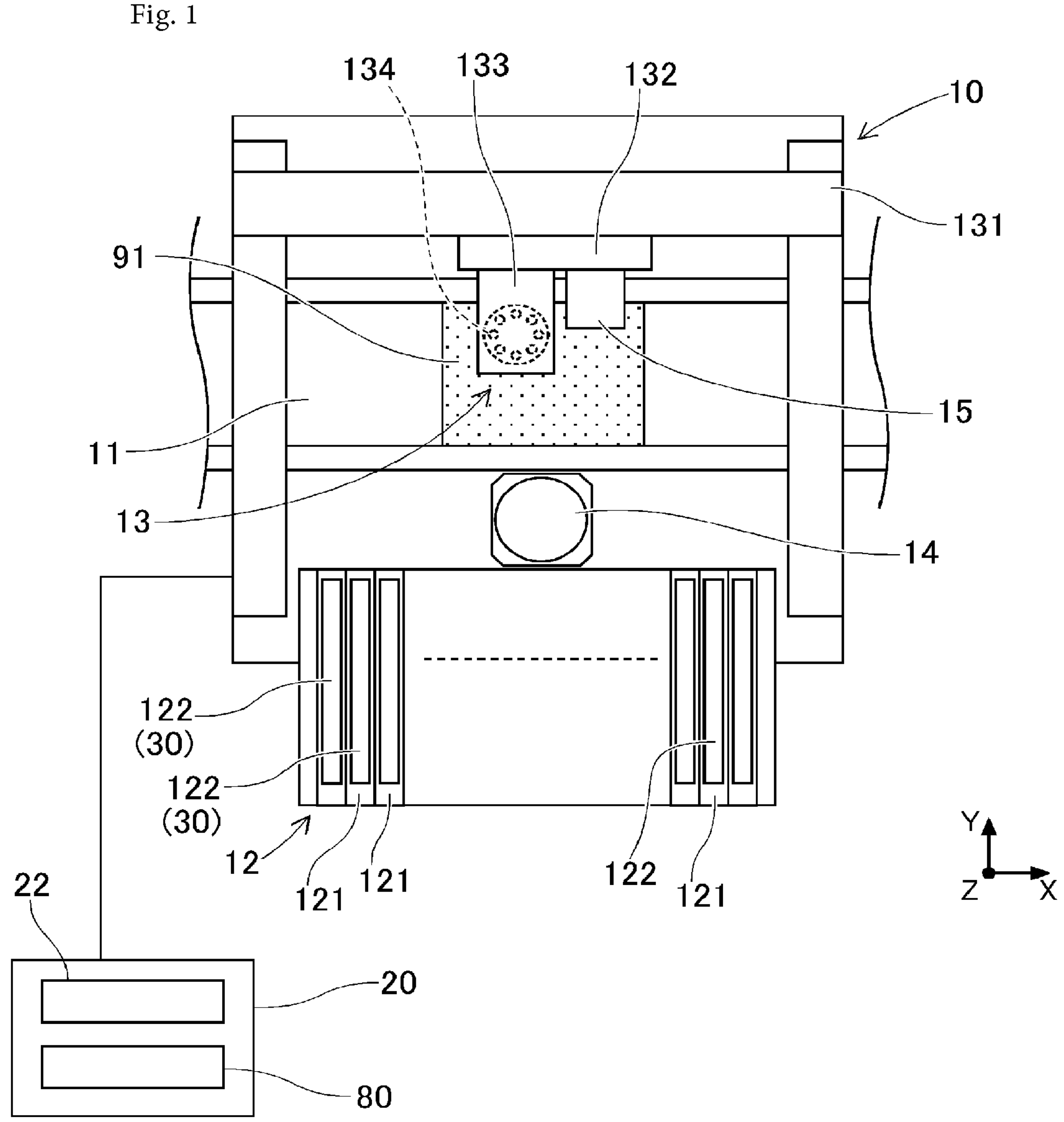
FIG. 1 is a plan view schematically illustrating a component mounter provided with a bulk feeder.

As illustrated in FIG. 1, component mounter 10 includes substrate conveyance device 11. Substrate conveyance device 11 subsequently conveys substrate 91 in a conveyance direction and positions substrate 91 in a predetermined position in component mounter 10.

1-2. Component Supply Device 12

Component mounter 10 includes component supply device 12. Component supply device 12 supplies components to be mounted on substrate 91. Component supply device 12 includes feeders 122 which are provided individually in multiple slots 121. A tape feeder, which is configured to feed and move a carrier tape housing, for example, a number of components so as to supply the components to be collected, is applied to feeder 122. In addition, bulk feeder 30 that supplies a component accommodated in a bulk state (a state in which each posture is irregular) so as to be collectable is applied to feeder 122. Details of bulk feeder 30 will be described later.

1-3. Component Transfer Device 13

Component mounter 10 includes component transfer device 13. Component transfer device 13 transfers the component supplied by component supply device 12 onto a predetermined mounting position on substrate 91. Component transfer device 13 includes head driving device 131, moving body 132, mounting head 133, and suction nozzles 134. Head driving device 131 moves moving body 132 in a horizontal direction (an X-direction and a Y-direction) by a linear motion mechanism. Mounting head 133 is detachably fixed to moving body 132 by a clamp member, not illustrated, and is provided to be movable in the horizontal directions within the mounter.

Mounting head 133 supports multiple suction nozzles 134 in such a manner as to be rotated, and raised and lowered. Suction nozzle 134 is a holding member that collects and holds component 92 supplied by feeder 122. Suction nozzle 134 picks up the component supplied by feeder 122 by supplied negative pressure air. As a holding member to be attached to mounting head 133, a chuck or the like can be adopted which holds the component by gripping the component.

1-4. Part Camera 14 and Substrate Camera 15

Component mounter 10 includes part camera 14 and substrate camera 15. Part camera 14 and substrate camera 15 are digital imaging devices having an imaging element, such as CMOS. Part camera 14 and substrate camera 15 execute imaging based on control signals and send out image data acquired through the imaging. Part camera 14 is configured to image the component held by suction nozzle 134 from below. Substrate camera 15 is provided on moving body 132 in such a manner as to be movable in the horizontal direction together with mounting head 133. Substrate camera 15 is configured to image substrate 91 from above.

Figures 3, 4:
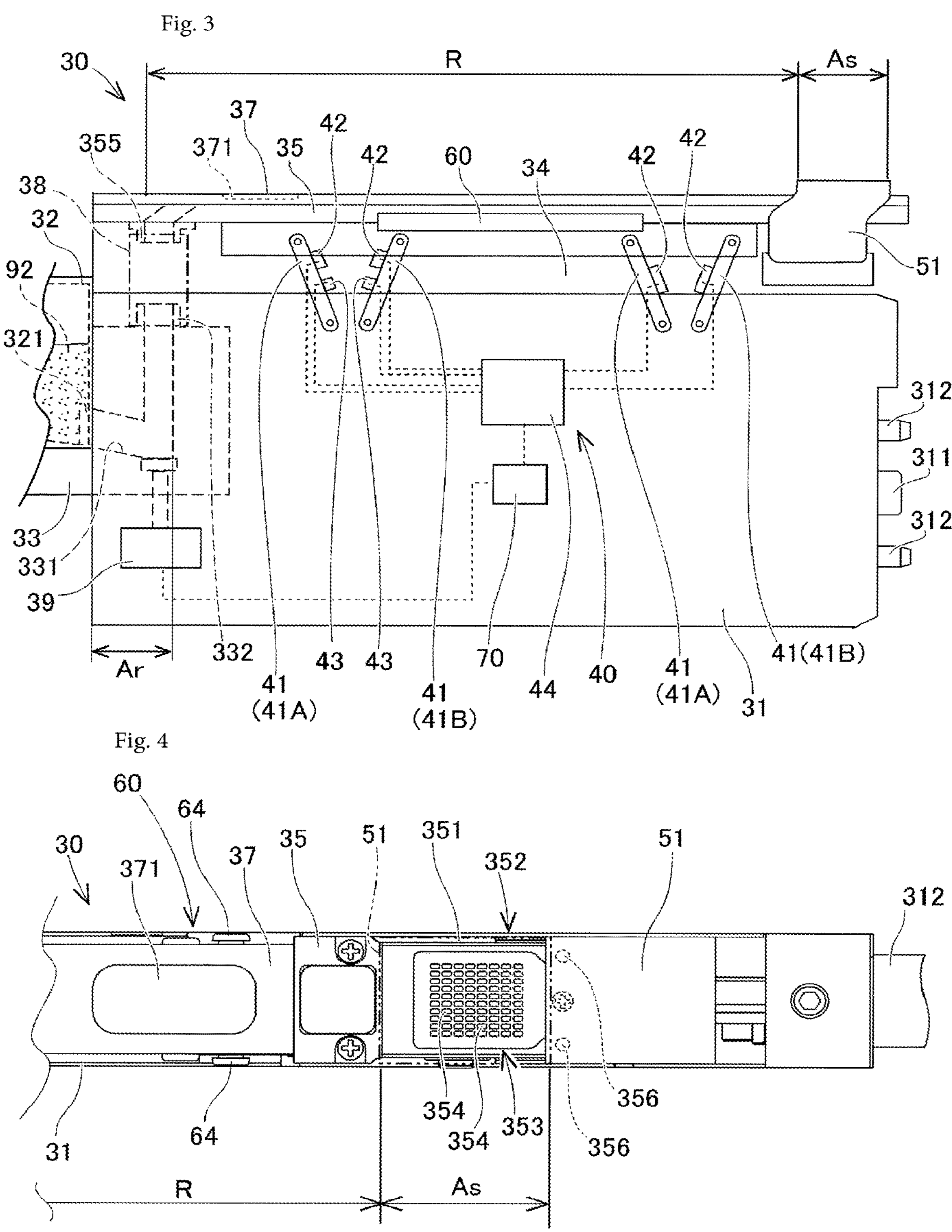
FIG. 3 is a side view schematically illustrating a main part of the bulk feeder.
FIG. 4 is a plan view as viewed from an IV direction in FIG. 2.

Substrate camera 15 can image a front surface of substrate 91 as an imaging target and can also image various types of devices additionally as imaging targets as long as those devices fall within the movable range of moving body 132. For example, in the present embodiment, as illustrated in FIG. 4, substrate camera 15 can image supply region As to which bulk feeder 30 supplies component 92 or reference mark 356 provided on the upper portion of bulk feeder 30 in a visual field of the camera. Thus, as described above, substrate camera 15 can be used commonly to image different imaging targets in order to acquire image data for use in various image processing.

1-5. Control Device 20

As illustrated in FIG. 1, component mounter 10 includes control device 20. Control device 20 mainly includes a CPU, various memories, a control circuit, and a storage device. Control device 20 stores various data such as a control program used for controlling a mounting process in control device 20. The control program denotes mounting positions, mounting angles, and a mounting order of components which are mounted on substrate 91 in the mounting process.

Control device 20 executes recognition processing of a holding state of the component held by each of multiple holding members (suction nozzles 134). Specifically, control device 20 executes image processing on the image data acquired by the imaging of part camera 14 and recognizes a position and an angle of each component with respect to a reference position of mounting head 133. It should be noted that, in addition to part camera 14, for example, control device 20 may execute the image processing on image data acquired by imaging the component by a head camera unit or the like provided integrally with mounting head 133 from side, below, or above.

Control device 20 controls a mounting operation of the component by mounting head 133 based on the control program to execute the mounting process. Here, the mounting process includes a process of repeating a PP cycle (a pick-and-place cycle) including a collection operation and a mounting operation multiple times. The "collection operation" described above is an operation in which the component supplied by component supply device 12 is collected by suction nozzle 134.

In the present embodiment, control device 20 controls the operation of component supply device 12 including bulk feeder 30 when executing the above-described collection operation. The control targeted for the operation of bulk feeder 30 includes, for example, the supply operation of component 92 by bulk feeder 30, and the control of an opening/closing operation of shutter 51 described later.

Control device 20 includes state recognition section 22. State recognition section 22 recognizes the supply states of multiple components 92 in supply region As of bulk feeder 30 based on the image data acquired by the imaging of the camera (in the present embodiment, substrate camera 15). The processing for recognizing the supply state includes processing for recognizing whether there is component 92 that can be collected in supply region As, and when there is component 92 that can be collected, recognizing the position and the angle of component 92. Moreover, control device 20 controls an operation of mounting head 133 in the collection operation based on a result of the recognition processing of the supply state.

In addition, the "mounting operation" described above is an operation of mounting the collected component at a predetermined mounting angle in a predetermined mounting position on substrate 91. In the mounting process, control device 20 controls the operation of mounting head 133 based on information output from various sensors, the result of image processing, a control program, or the like. As a result, the positions and angles of multiple suction nozzles 134 supported by mounting head 133 are controlled.

2. Configuration of Bulk Feeder 30

Bulk feeder 30 is provided on component mounter 10 and functions as a part of component supply device 12. Bulk feeder 30 supplies component 92 accommodated in a bulk state that is not aligned like a carrier tape. Therefore, since bulk feeder 30 does not use a carrier tape unlike the tape feeder, it has a merit in that loading of the carrier tape, collection of the used tape, or the like can be omitted.

Bulk feeder 30 is, for example, of a type that supplies component 92 in an irregular posture to a planar supply region As. However, when components 92 are so close to each other or deposited (in a state overlapping in an up-down direction) that components 92 are in contact with each other in supply region As, or when component 92 are in a horizontal posture so that a width direction of components 92 is in the up-down direction, bulk feeder 30 cannot make component 92 as the collection target. Accordingly, in order to increase a ratio of components 92 which can be collected, there is a type of bulk feeder 30 that supplies components 92 in an aligned state in supply region As. In the present embodiment, bulk feeder 30 of the type in which components 92 are aligned will be exemplified.

2-1. Feeder Main Body 31

Figure 2:
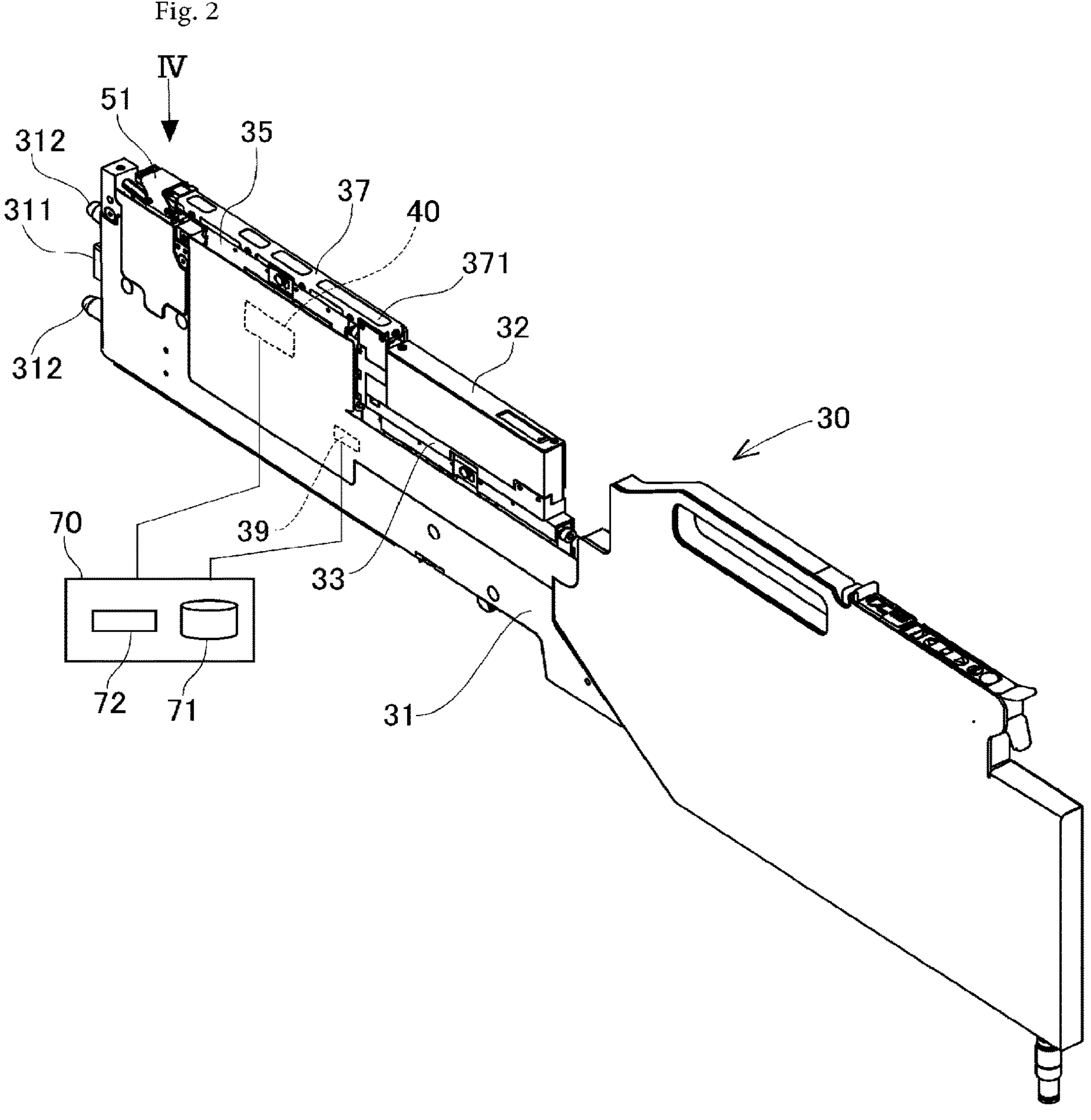
FIG. 2 is a perspective view illustrating an appearance of the bulk feeder.

As illustrated in FIG. 2, bulk feeder 30 includes feeder main body 31 formed in a flat box shape. Connector 311 and two pins 312 are provided at a front portion of feeder main body 31. When feeder main body 31 is set in slot 121 of component supply device 12, power is supplied via connector 311 and communication with control device 20 is enabled. Two pins 312 are inserted into guide holes provided in slot 121, and are used for positioning when feeder main body 31 is set in slot 121.

2-2. Component Case 32 and Receiving Member 33

Component case 32 for accommodating multiple components 92 in a bulk state is detachably attached to feeder main body 31 via receiving member 33. Component case 32 is an external device of bulk feeder 30. One suitable for the mounting process is selected from various types of component cases 32 and attached to feeder main body 31. Discharge port 321 through which component 92 is discharged to the outside is formed in a front portion of component case 32.

Receiving member 33 is provided to be vibratable with respect to feeder main body 31, and supports attached component case 32. Receiving member 33 is formed with receiving region Ar for receiving component 92 discharged from component case 32. In the present embodiment, receiving member 33 has inclined portion 331 inclined toward the front side with respect to a horizontal plane in receiving region Ar. Inclined portion 331 is located below discharge port 321 of component case 32 and has a planar shape. Receiving member 33 is formed with a flow path of component 92 extending above receiving region Ar, and feed-out section 332 through which the flow path opens upward is formed.

2-3. Bracket 34, Track Member 35, and Lock Unit 60

Bulk feeder 30 includes bracket 34 and track member 35. Bracket 34 is provided to be vibratable with respect to feeder main body 31. Bracket 34 is formed in a block shape extending in a front-rear direction of feeder main body 31, and track member 35 is attached to an upper surface of bracket 34. Bracket 34 is supported by support member 41 of excitation device 40 described later. Track member 35 is formed with conveyance path R through which multiple components 92 are conveyed, and supply region As that communicates with conveyance path R and opens upward so as to be able to collect multiple components 92.

Bulk feeder 30 includes lock unit 60. Lock unit 60 locks track member 35 in a state in which track member 35 is attached to bracket 34. When track member 35 is locked by lock unit 60, it is brought into a state in which track member 35 vibrates integrally with bracket 34 with respect to feeder main body 31. Track member 35 is brought into a state in which it can be removed from bracket 34 by unlocking of lock unit 60. The detailed configuration of lock unit 60 will be described later.

2-4. Detailed Configuration of Track Member 35, Cover 37, and Connection Member 38

Track member 35 is formed so as to extend in the front-rear direction (left-right direction in FIG. 4) of feeder main body 31. Pair of side walls 351 protruding upward is formed on both edges of track member 35 in the width direction (the up-down direction in FIG. 4). Pair of side walls 351 surrounds a periphery of conveyance path R together with distal end portion 352 of track member 35, so as to prevent leakage of component 92 conveyed through conveyance path R. Circular reference mark 356 indicating a reference position of supply region As is affixed to an upper surface of distal end portion 352 in a pair in the left-right direction.

In the present embodiment, alignment member 353 is exchangeably attached to track member 35. Alignment member 353 has multiple cavities 354 that individually accommodate multiple components 92. Specifically, multiple cavities 354 are arranged in a matrix in supply region As. For example, alignment member 353 has a total of 80 cavities 354 that are regularly arranged 8 in the conveyance direction and 10 in the width direction of conveyance path R. Each of multiple cavities 354 opens upward to accommodate component 92 in a posture in which a thickness direction of component 92 is in the up-down direction.

The opening of cavity 354 is set to a dimension slightly larger than an outer shape of component 92 in an upward view. The depth of cavity 354 is set according to the type (shape, mass, or the like) of component 92. One selected from various types of track members 35 based on the type of component 92, the required number of cavities 354, and the functionality is attached.

Here, "supply region As" of track member 35 is a region for supplying component 92 in a bulk state, and is a region from which component 92 can be collected by suction nozzle 134 supported by mounting head 133. In addition, "conveyance path R" of track member 35 is a path of component 92 through which component 92 flowed from receiving region Ar to track member 35 is conveyed to supply region As.

Bulk feeder 30 includes cover 37. Cover 37 is fixed to track member 35 and covers an upper portion of conveyance path R. Cover 37 has multiple exhaust ports 371 formed on an upper surface thereof. A mesh having a joint smaller than an outer dimension of component 92 is stretched in exhaust port 371. With such a configuration, cover 37 is configured to be able to discharge air from exhaust port 371 to the outside while preventing component 92 from protruding from conveyance path R.

Track member 35 is formed with a flow path of component 92 extending downward at a rear portion thereof, and has introduction portion 355 through which the flow path opens downward. Introduction portion 355 faces feed-out section 332 of receiving member 33 in the up-down direction. Bulk feeder 30 includes tubular connection member 38. Connection member 38 connects feed-out section 332 of receiving member 33 and introduction portion 355 of track member 35. In the present embodiment, connection member 38 is a tight coil spring and has flexibility as a whole.

According to the configuration as described above, connection member 38 connects receiving region Ar and conveyance path R so that multiple components 92 are able to flow between receiving region Ar and conveyance path R. In addition, connection member 38 absorbs the vibration by being deformed in accordance with the vibration of receiving member 33 and the vibration of track member 35 with respect to feeder main body 31. Connection member 38 alleviates or blocks vibration transmitted between receiving member 33 and track member 35 that vibrate independently of each other.

2-5. Air Supply Device 39

Bulk feeder 30 includes air supply device 39. Air supply device 39 supplies positive pressure air from a lower side of receiving region Ar, so that multiple components 92 are caused to flow from receiving member 33 to track member 35 via connection member 38. In the present embodiment, air supply device 39 supplies or blocks the positive pressure air supplied from the outside from the lower side of receiving region Ar based on a command from feeder control device 70 described later.

When air supply device 39 supplies the positive pressure air, multiple components 92 staying in receiving region Ar are blown upward by the positive pressure air. The positive pressure air and multiple components 92 flow in this order through feed-out section 332 of receiving member 33, connection member 38, and introduction portion 355, and reach conveyance path R of track member 35. Here, the positive pressure air is exhausted to the outside from exhaust port 371 of cover 37. In addition, multiple components 92 fall into conveyance path R of track member 35 by their own weight.

2-6. Excitation Device 40

Bulk feeder 30 includes excitation device 40 provided in feeder main body 31. Excitation device 40 applies vibration to track member 35 so that multiple components 92 are conveyed along conveyance path R. Specifically, excitation device 40 includes multiple support members 41, multiple piezoelectric elements 42, vibration sensor 43, and power supply device 44. Multiple support members 41 directly or indirectly connect feeder main body 31 and bracket 34 to support bracket 34.

In the present embodiment, multiple support members 41 include forward movement support member 41A used for front-side conveyance of component 92 and rearward movement support member 41B used for rear-side conveyance. Inclination directions of forward movement support member 41A and rearward movement support member 41B with respect to a vertical direction are different from each other. Multiple piezoelectric elements 42 are vibrators that vibrate at a frequency corresponding to power supplied from power supply device 44. Multiple piezoelectric elements 42 are attached to multiple support members 41, respectively.

When at least some of multiple piezoelectric elements 42 vibrate, vibration is applied to track member 35 via bracket 34. In addition, the amplitude of track member 35 changes in accordance with the voltage applied to piezoelectric element 42. Vibration sensor 43 detects the frequency or amplitude of the actual vibration of track member 35 when piezoelectric element 42 is supplied with power and vibrated. In the present embodiment, vibration sensor 43 is provided in multiple support members 41 that support bracket 34 that vibrates integrally with track member 35.

Here, when excitation device 40 applies vibration to track member 35, track member 35 performs an elliptical motion in the side view. As a result, an external force of a front side and an upper side, or an external force of a rear side and an upper side is applied to multiple components 92 in conveyance path R according to a rotational direction of the elliptical motion of track member 35. As a result, multiple components 92 are conveyed to the front side or the rear side of track member 35.

Power supply device 44 changes the frequency and the applied voltage of the power supplied to piezoelectric element 42 based on a command of feeder control device 70 described later. As a result, the frequency and the amplitude of the vibration applied to track member 35 are adjusted, so that the rotational direction of the elliptical motion of track member 35 is determined. When the frequency or amplitude of the vibration of track member 35 and the rotational direction of the elliptical motion caused by the vibration change, a conveyance speed of component 92 to be conveyed, a degree of dispersion of component 92, a conveyance direction, and the like change.

Therefore, in order to improve conveyance efficiency, excitation device 40 sets in advance power supply (frequency, applied voltage) corresponding to vibration characteristics (including the natural frequency) having individual differences. For example, bulk feeder 30 executes calibration processing in a state in which track member 35 used for a supply operation to be executed is attached, that is, in a state in which track member 35 is locked by lock unit 60 with respect to bracket 34. Details of the above-described calibration processing will be described later.

2-7. Shutter 51

Bulk feeder 30 has shutter 51 provided above track member 35 and is capable of closing the opening of supply region As. By opening or closing shutter 51, bulk feeder 30 can prevent component 92 from protruding and foreign matters from entering supply region As. In the present embodiment, shutter 51 is switched between an open state, a closed state, and an intermediate state by an opening/closing operation. The closed state of shutter 51 is a state in which shutter 51 comes into contact with track member 35 and the opening of supply region As is completely closed. At this time, as indicated by dashed lines in FIG. 4, shutter 51 is located on the rear side of feeder main body 31 with respect to pair of reference marks 356 of track member 35, so that pair of reference marks 356 can be visually recognized and imaged in the upward view.

In addition, the open state of shutter 51 is a state in which the opening of supply region As is not closed and a principal range (range where multiple cavities 354 are provided in the present embodiment) of supply region As is exposed. At this time, suction nozzle 134 can execute the collection operation of component 92 on any of the cavities 354. The intermediate state of shutter 51 is a state between the closed state and the open state in which shutter 51 is separated from track member 35 by at least the amplitude of track member 35 vibrated by the excitation of excitation device 40, and restricts the protruding of component 92 from the opening of supply region As. Shutter 51 is opened or closed by a driving device (not illustrated), and is brought into the closed state, the open state, and the intermediate state according to a driving state of the driving device.

3. Feeder Control Device 70

Bulk feeder 30 includes feeder control device 70. Feeder control device 70 mainly includes a CPU, various memories, or a control circuit. Feeder control device 70 is powered via connector 311 in a state in which bulk feeder 30 is set in slot 121, and is placed in a state capable of communicating with control device 20 of component mounter 10.

As illustrated in FIG. 2, feeder control device 70 includes storage section 71. Storage section 71 includes a flash memory or the like. Storage section 71 stores various data such as a program and a conveyance parameter used for controlling a component supplying process. The above-mentioned "conveyance parameter" is a parameter for controlling the operation of excitation device 40 so that the vibration applied to track member 35 is appropriate when component 92 is conveyed in the component supplying process, and is set in advance in association with each type of component 92, for example.

Feeder control device 70 includes conveyance control section 72. The conveyance control section 72 controls the operation of excitation device 40 to execute the conveying operation of component 92. Specifically, the conveyance control section 72 sends a command to power supply device 44 of excitation device 40 when executing the conveying operation. As a result, when power supply device 44 supplies a predetermined power to piezoelectric element 42, vibration is applied to track member 35 via bracket 34. Then, component 92 on conveyance path R is conveyed by receiving an external force so as to move in the conveyance direction.

4. Detailed Configuration of Lock Unit 60

In bulk feeder 30 configured as described above, track member 35 is made attachable or detachable from the viewpoint of improving the maintainability and corresponding to various components and supply forms. In the present embodiment, receiving member 33 corresponding to various component cases 32, track member 35, connection member 38 connecting the same, and cover 37 attached to track member 35 are configured to be attached to or detached from feeder main body 31 as a set of conveying units.

Track member 35 of the conveying unit is attached to bracket 34 as described above. While it is expected to improve exchangeability by facilitating the attachment or detachment of track member 35, since track member 35 is a member to be vibrated by excitation device 40, it is necessary to surely lock track member 35 to bracket 34.

For example, it is assumed that bracket 34 and track member 35 are fastened by bolts. However, since bulk feeder 30 is provided in slot 121 of component supply device 12, dimensions thereof in a width direction are limited so as not to interfere with the adjacent feeder 122. In addition, the bolt should be disposed at a position on conveyance path Rat which the movement of component 92 is not obstructed, so that the position at which the bolt can be disposed is limited. Accordingly, in a case where attachable/detachable track member 35 is applied to bulk feeder 30, there has been a concern that a dedicated tool should be used due to the above constraint, or that an attachment/detachment operation is difficult, and a time required is increased.

Meanwhile, bulk feeder 30 of the present embodiment adopts a lock mechanism capable of easily attaching and detaching track member 35 and having durability to vibration. Specifically, lock unit 60 includes a locking target member provided in a first one of track member 35 and bracket 34, and lock member 62 provided in a second one of track member 35 and bracket 34. Further, it is preferable that lock unit 60 includes an elastic member (spring 63), operation section 64, and holding section 65.

4-1. Locking Target Member (Pair of Pins 61)

Figures 5, 6:
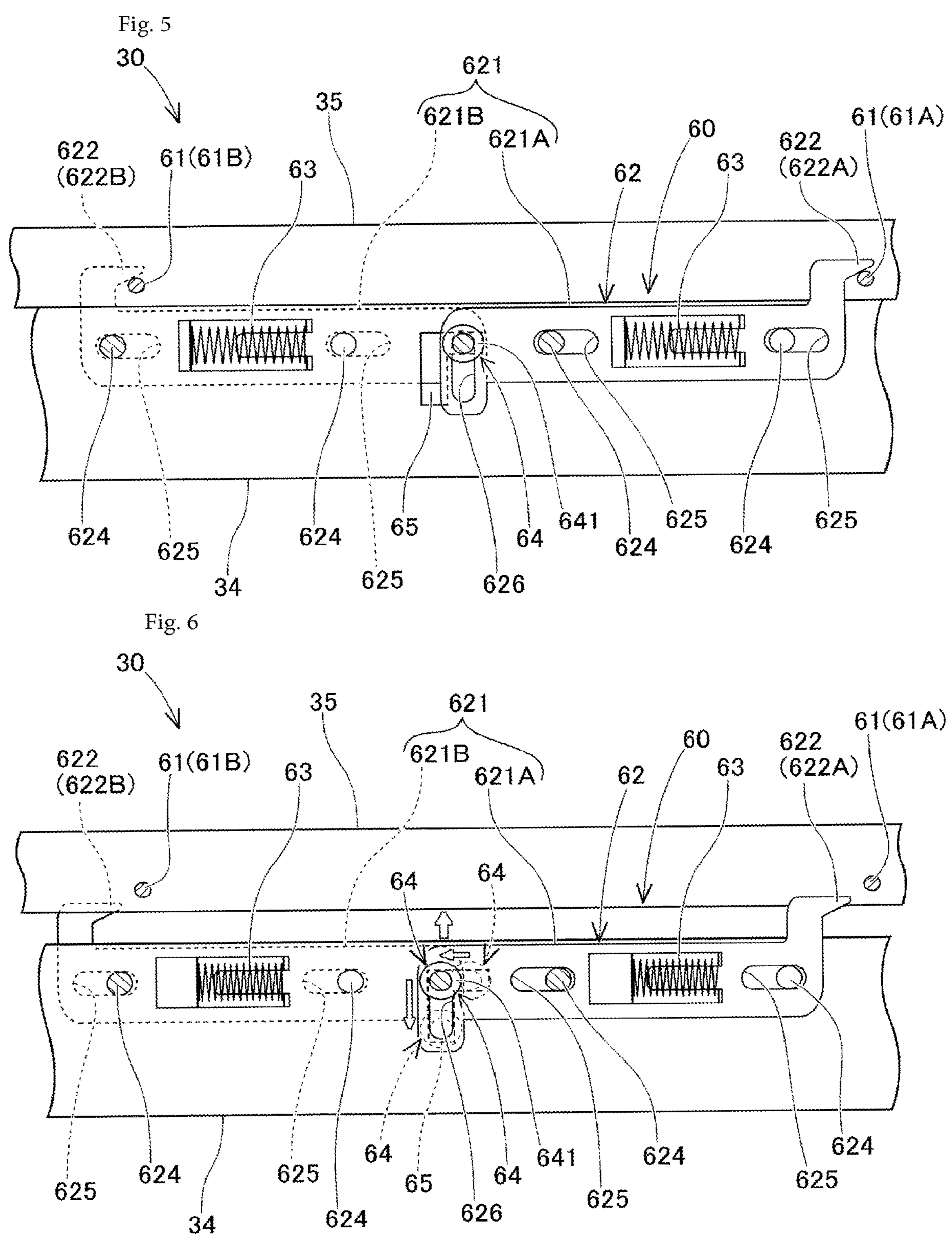
FIG. 5 is a side view illustrating a configuration of a lock unit.
FIG. 6 is a side view illustrating an operation of the lock unit.

The locking target member of lock unit 60 is pair of pins 61 as illustrated in FIG. 5 in the present embodiment. Each of pair of pins 61 protrudes in the width direction (front-rear direction in FIG. 5) and in the horizontal direction of feeder main body 31, and is provided at positions different from each other in the front-rear direction of feeder main body 31.

In the present embodiment, pair of pins 61 is provided on a side surface of track member 35. Front pin 61A of pair of pins 61 is provided on a right surface of track member 35. Rear pin 61B of pair of pins 61 is provided on a left surface of track member 35. Each of pair of pins 61 is formed in a cylindrical shape. Each length of pair of pins 61 is set such that a distal end of pin 61 is located inside a side surface of feeder main body 31 in the width direction of feeder main body 31 in a state in which track member 35 is attached to bracket 34.

4-2. Lock Member 62

Lock member 62 is a member that is switched between a locked state and a released state. The "locked state" described above is a state in which track member 35 is locked by pair of pins 61 to restrict the relative movement of track member 35 with respect to bracket 34. In addition, the "released state" described above is a state in which the lock with pair of pins 61 is released. When lock member 62 is in the released state, lock unit 60 becomes an unlocked state that allows track member 35 to be removed.

In the present embodiment, lock member 62 is provided on a side surface of bracket 34. In the present embodiment, lock member 62 has hook main body 621 and pair of hook portions 622. Hook main body 621 is provided to be slidable in the front-rear direction of feeder main body 31. In the present embodiment, hook main body 621 includes two of front plate 621A and rear plate 621B that are disposed so as to sandwich bracket 34 from the left-right direction.

Hook main body 621 is formed with multiple horizontal elongated holes 625 extending in the front-rear direction. Hook main body 621 is configured to be slidable in the front-rear direction with respect to bracket 34 by causing multiple support pins 624 fixed to bracket 34 to pass through multiple horizontal elongated holes 625. Pair of hook portions 622 is provided in hook main body 621. Specifically, front hook portion 622A of pair of hook portions 622 is formed in an upper portion of a front end of front plate 621A. Rear hook portion 622B of pair of hook portions 622 is formed in an upper portion of a rear end of rear plate 621B.

As illustrated in FIG. 5, each of pair of hook portions 622 is formed in an L-shape protruding upward from the upper surface of bracket 34 and curved toward the front side. Pair of hook portions 622 is moved to a first end side (in the present embodiment, the front side in the front-rear direction) in a slide direction of hook main body 621 and locked to pair of pins 61. In addition, pair of hook portions 622 is moved to the second end side (in the present embodiment, the rear side in the front-rear direction) in the slide direction of hook main body 621, and is separated from pair of pins 61 (see FIG. 6).

4-3. Elastic Member (Spring 63)

Lock unit 60 includes multiple springs 63 in the present embodiment. Each of multiple springs 63 is an elastic member that biases hook main body 621 with respect to feeder main body 31 in a direction in which pair of hook portions 622 are locked to pair of pins 61. Specifically, spring 63 is a compression coil spring. Spring 63 is disposed so that a longitudinal direction thereof is in the front-rear direction, a first end thereof is fixed to hook main body 621, and the second end thereof is fixed to bracket 34.

According to the configuration as described above, spring 63 biases hook main body 621 toward the front side with respect to bracket 34. As a result, hook main body 621 moves forward to a position where support pin 624 comes into contact with a rear end of horizontal elongated hole 625 in a state in which the external force is not applied. At this time, when track member 35 is attached to bracket 34, spring 63 biases hook main body 621 so that the state in which pair of hook portions 622 is locked to pair of pins 61 is maintained.

4-4. Operation Section 64

Operation section 64 receives an operation force for switching between the locked state and the released state. In the present embodiment, operation section 64 is a shaft member that passes through lock member 62. More specifically, operation section 64 is formed in a region where front plate 621A and rear plate 621B of lock member 62 overlap in the front-rear direction, and passes through vertical elongated hole 626 extending in the up-down direction. As a result, operation section 64 is configured to be locked in the front-rear direction with respect to lock member 62, and to be movable in the extending range of vertical elongated hole 626 in the up-down direction. In addition, as illustrated in FIG. 4, operation section 64 is prevented from coming off from lock member 62 by flanges 641 provided at both ends.

As described above, operation section 64 is in a state in which at least flange 641 is exposed to the outside, and receives the operation force in the front-rear direction by an operator. For example, in the locked state of lock unit 60, when operation section 64 receives a rearward operation force, lock member 62 moves to the rear side against a biasing force of spring 63. As a result, pair of hook portions 622 is separated from pair of pins 61, so that hook main body 621 is brought into the released state (the unlocked state of lock unit 60). In the above state, when the operator stops the operation, lock member 62 moves to the front side by the biasing force of spring 63. As a result, pair of hook portions 622 is locked to pair of pins 61, so that hook main body 621 is brought into the locked state again.

4-5. Holding Section 65

Holding section 65 is used for maintaining the open state of lock unit 60. Here, operation section 64 passes through vertical elongated hole 626 provided in hook main body 621, so that the relative movement in the front-rear direction with respect to hook main body 621 is restricted, and the relative movement in the up-down direction with respect to hook main body 621 is permitted. In a state in which hook main body 621 is switched to the released state by the operation section 64, holding section 65 maintains the released state by holding operation section 64 which has moved downward with respect to hook main body 621 by the downward operation force.

In the present embodiment, holding section 65 is an L-shaped groove provided in bracket 34 and having an L-shape in a side view. Operation section 64 passes through both holding section 65 which is an L-shaped groove and vertical elongated hole 626 of hook main body 621. With such a configuration, as illustrated in FIG. 6, when hook main body 621 moves to a moving end on the rear side by the operation section 64, vertical elongated hole 626 of hook main body 621 overlaps with a part of the L-shaped groove which extends in the up-down direction, so that the downward movement of operation section 64 is permitted.

At this time, when the downward operation force is applied to operation section 64 and the operation section moves, the movement of operation section 64 in the front-rear direction is restricted by holding section 65 having a part extending in the up-down direction of the L-shaped groove. As a result, the open state of hook main body 621 is maintained. At this time, spring 63 is maintained in a compressed state. In this manner, when the open state of lock unit 60 is maintained without applying the operation force to operation section 64, the operator can perform a separate operation by releasing the hand from operation section 64. As a result, the operation for attaching and detaching track member 35 from bracket 34 is facilitated, so that efficiency of a setup replacement operation or the like can be improved.

5. Configuration of Feeder Management Device 80

Figure 7:
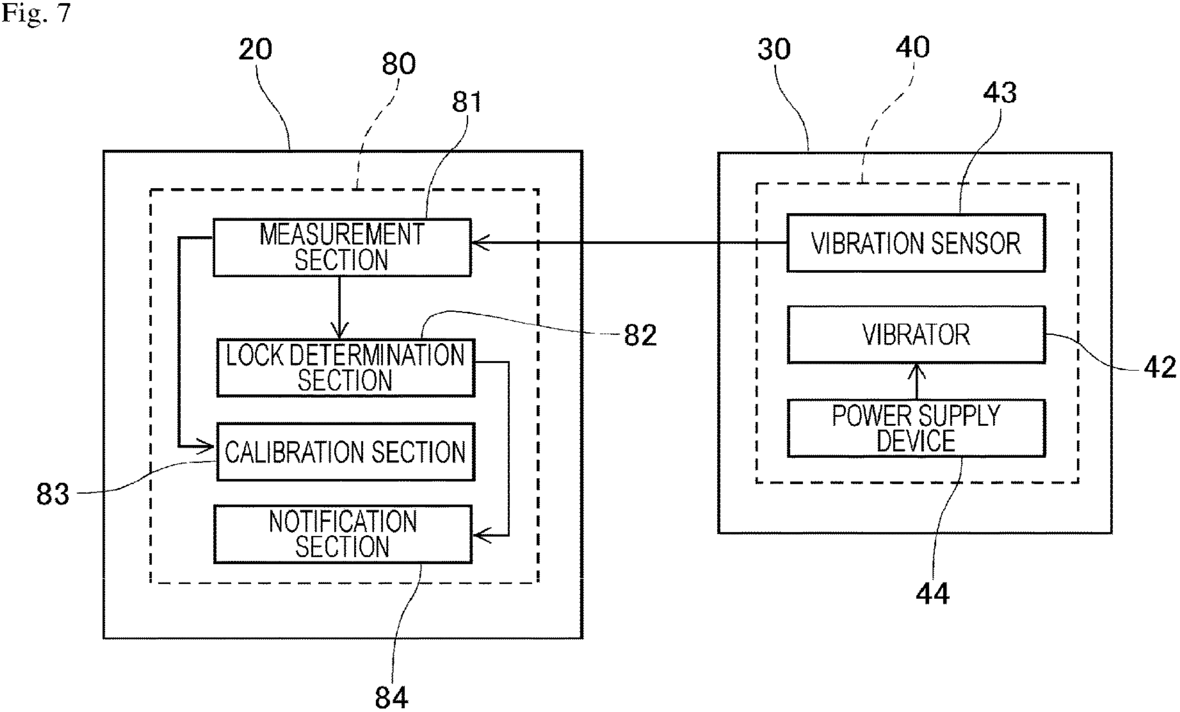
FIG. 7 is a block diagram illustrating the component mounter and a feeder management device.

Component mounter 10 includes feeder management device 80 for bulk feeder 30. In the present embodiment, as illustrated in FIG. 7, feeder management device 80 is incorporated in control device 20 and is configured to be able to communicate with bulk feeder 30 provided in slot 121. Feeder management device 80 recognizes the state and unique characteristics of bulk feeder 30 and performs management based on the state and unique characteristics so that bulk feeder 30 can appropriately perform the supply operation.

5-1. Measurement Section 81

As illustrated in FIG. 7, feeder management device 80 includes measurement section 81. Measurement section 81 measures the frequency or amplitude of the vibration of bracket 34 when excitation device 40 excites track member 35. In the present embodiment, measurement section 81 measures the frequency of the vibration of bracket 34 based on the value detected by vibration sensor 43 of excitation device 40. The frequency of the vibration of bracket 34 is the frequency of the actual vibration of bracket 34 to which track member 35 is attached when excitation device 40 attempts to apply the vibration to track member 35.

5-2. Lock Determination Section 82

As illustrated in FIG. 7, feeder management device 80 includes lock determination section 82. Lock determination section 82 determines whether the lock of track member 35 with respect to bracket 34 is suitable based on the result measured by measurement section 81. In the present embodiment, lock determination section 82 determines whether the lock is suitable by comparison with a vibration characteristic stored in advance.

Specifically, lock determination section 82 first acquires, from control device 20, a natural frequency as a vibration characteristic when bracket 34 and track member 35 vibrate integrally by the excitation of excitation device 40. This natural frequency can be identified, for example, by cyclically exciting track member 35 with multiple types of frequencies and detecting the resonance point. Identifying processing of the natural frequency is executed, for example, after the operator confirms that lock unit 60 is operating normally, that is, that track member 35 is fixed to bracket 34.

Next, lock determination section 82 determines whether a difference between the acquired natural frequency and the measurement result by measurement section 81 is within a preset allowable range. At this time, measurement section 81 measures an actual frequency when excitation device 40 applies vibration to track member 35 so that track member 35 vibrates at the natural frequency. In addition, the allowable range is a range set in advance in consideration of measurement errors and the like.

Lock determination section 82 determines that the lock of track member 35 with respect to bracket 34 is unsuitable when the difference is outside the allowable range. This determination is made using the fact that, when track member 35 is not normally locked to bracket 34, the mass of the vibrating body decreases and the natural frequency changes. When the difference is within the allowable range, lock determination section 82 determines that the lock of track member 35 with respect to bracket 34 is normal.

5-3. Calibration Section 83

As illustrated in FIG. 7, feeder management device 80 includes calibration section 83. Calibration section 83 executes the calibration processing for calibrating the operation of excitation device 40. Calibration section 83 adjusts the power supplied to the vibrator (piezoelectric element 42) based on the result measured by measurement section 81 in a state in which track member 35 is locked to bracket 34. Calibration section 83 then acquires the power supplied to the vibrator (piezoelectric element 42) when bracket 34 and track member 35 vibrate integrally with each other at the natural frequency.

Specifically, calibration section 83 first acquires, from control device 20, the natural frequency as a vibration characteristic when bracket 34 and track member 35 vibrate integrally by the excitation of excitation device 40. Next, calibration section 83 instructs power supply device 44 of excitation device 40 to supply predetermined power to piezoelectric element 42 for a predetermined period of time. In the period, measurement section 81 measures the frequency of the actual vibration of track member 35 based on the value detected by vibration sensor 43.

Subsequently, calibration section 83 adjusts the power to piezoelectric element 42 by power supply device 44 based on the frequency as the measurement result with respect to the vibration. At this time, calibration section 83 adjusts the power to the piezoelectric element based on the difference between the measured actual frequency and the previously acquired natural frequency. Calibration section 83 acquires the power supplied to piezoelectric element 42 when bracket 34 and track member 35 integrally vibrate at the natural frequency by repeating the measurement and the adjustment as described above.

In addition to the above-described methods, calibration section 83 may instruct that the power supplied for a predetermined period of time be changed stepwise, for example, and compare the frequency measured in each period with a known natural frequency. Calibration section 83 then acquires the power supplied in a period that has reached the frequency closest to the natural frequency. In this manner, calibration section 83 acquires the power necessary for vibrating at the natural frequency in the current configuration of bulk feeder 30.

Calibration section 83 then sets the power to bulk feeder 30 as a reference power in conveying component 92. As a result, bulk feeder 30 performs control so that power supply device 44 supplies the set reference power to piezoelectric element 42 when performing the conveying operation of component 92 based on an external command. It should be noted that bulk feeder 30 may add predetermined correction or the like to the reference power according to the form of the conveying operation (feeding operation, return operation, or the like).

It should be noted that the above-described natural frequency is unique for each bulk feeder 30, and is changed according to track member 35 attached to bulk feeder 30. Therefore, it is preferable to perform the identifying processing and the calibration processing of the natural frequency at least after track member 35 is exchanged. Further, in consideration of that appropriate power may change depending on the operating time of bulk feeder 30 or the like, calibration section 83 may execute the calibration processing to accommodate the current state, for example, after a certain period of time elapses or when the power supply is applied.

5-4. Notification Section 84

As illustrated in FIG. 7, feeder management device 80 includes notification section 84. Notification section 84 issues a notification to the operator when lock determination section 82 determines that the lock of track member 35 with respect to bracket 34 is unsuitable. Specifically, notification section 84 may cause a display device (not illustrated) provided in component mounter 10 to display the information specifying slot 121 as well as the fact that the lock is unsuitable.

In addition to or in place of the above, notification section 84 may turn on an error indicator lamp (not illustrated) provided in bulk feeder 30, for example. As a result, the operator can recognize that track member 35 is not normally attached to bracket 34. Accordingly, track member 35 is surely attached to bracket 34 by the operator performing the re-attachment or the confirmation operation of track member 35. As a result, it is possible to prevent the occurrence of an operation failure of bulk feeder 30 caused by the unsuitable locking of track member 35.

6. Lock Determination Processing by Feeder Management Device 80

Figure 8:
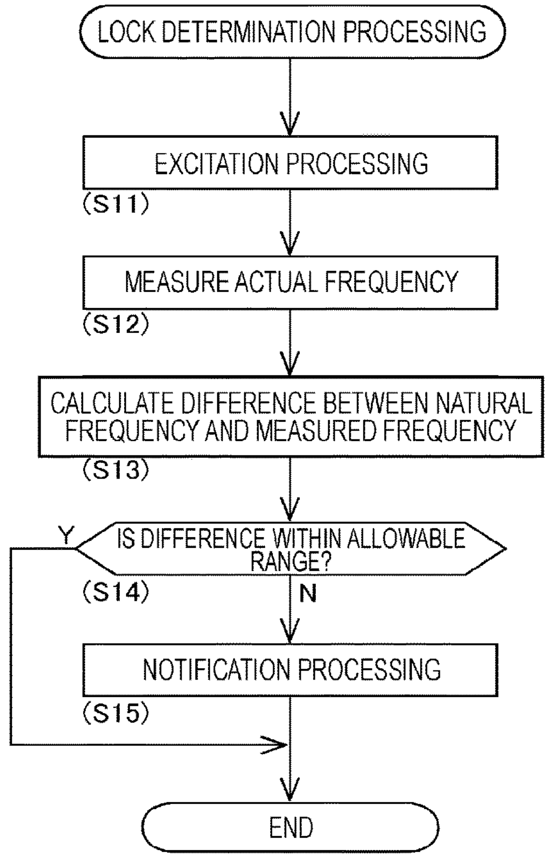
FIG. 8 is a flowchart illustrating lock determination processing.

The lock determination processing by feeder management device 80 will now be described with reference to FIG. 8. Feeder management device 80 performs lock determination processing for determining whether the lock of track member 35 with respect to bracket 34 by lock unit 60 is suitable after the exchange of track member 35, when the power supply is applied, or when a request is made by the operator. It should be noted that feeder management device 80 may perform the identifying processing of the fixed frequency and the calibration processing of excitation device 40 in advance in accordance with the execution timing of the lock determination processing.

In the lock determination processing, measurement section 81 executes excitation processing for applying vibration to track member 35 by excitation device 40 so that track member 35 vibrates at the natural frequency (S11). Measurement section 81 then measures the actual frequency when the application of the vibration to track member 35 is attempted by S11 (S12). It should be noted that the measured frequency is an actual frequency of bracket 34 which is a member that vibrates integrally with track member 35.

Lock determination section 82 calculates a difference between the natural frequency relating to track member 35 currently attached to bracket 34 and the frequency measured in S12 (S13). When the calculated difference is within an allowable range set in advance (S14: Yes), lock determination section 82 determines that the lock of track member 35 with respect to bracket 34 is normal, and ends the lock determination processing.

On the other hand, when the calculated difference is outside the allowable range (S14: No), notification section 84 determines that the lock of track member 35 with respect to bracket 34 is unsuitable, and executes the notification processing (S15). In this notification processing, notification section 84 causes the display device provided in component mounter 10 to display the number of slot 121 provided with bulk feeder 30 whose lock is unsuitable, and a message prompting re-execution of the attaching operation. It should be noted that, after the operator executes the attaching operation of track member 35 based on the notification, feeder management device 80 executes the lock determination processing again.

7. Effects of Configuration of Embodiments

According to the configuration of bulk feeder 30 exemplified in the above embodiment, the attachment/detachment operation of track member 35 can be simplified by lock member 62 switching the locked state and the released state of track member 35 with respect to bracket 34. Accordingly, it is possible to improve the exchangeability of track member 35.

In addition, according to the configuration of feeder management device 80 exemplified in the above embodiment, it is possible to detect that the lock of track member 35 is unsuitable based on the actual vibration characteristic (frequency or amplitude) of bracket 34 to which track member 35 is attached. Accordingly, it is possible to prevent the occurrence of an operation failure caused by the unsuitable locking of track member 35.

8. Modifications of Embodiment 8-1. Lock Unit 60

In the embodiment, pin 61 is configured to be provided on track member 35 as the locking target member of lock unit 60. In addition, lock member 62 locked to pin 61 is configured to be provided in bracket 34. Meanwhile, lock unit 60 may be configured such that the locking target member (pin 61) is provided in bracket 34, and lock member 62 is provided in track member 35.

In addition, lock unit 60 includes spring 63 as an elastic member. Meanwhile, as lock unit 60, a member formed of an elastic material (for example, rubber) may be applied unlike spring 63. In addition, lock unit 60 may adopt a configuration in which the elastic member that biases lock member 62 in a direction of locking the locking target member is omitted. However, since vibration is applied to track member 35 in the operating state, a configuration in which a state in which pair of hook portions 622 are locked to pair of pins 61, that is, a configuration in which the locked state is always maintained by the elastic member is useful.

8-2. Feeder Management Device 80

In the embodiment, measurement section 81 of feeder management device 80 is configured to measure the frequency of the vibration of bracket 34 based on the value detected by vibration sensor 43 of excitation device 40. Meanwhile, measurement section 81 may measure the amplitude of the vibration of bracket 34. For example, in a state in which track member 35 is normally locked to bracket 34, when excitation device 40 supplies predetermined power to piezoelectric element 42, the amplitude of bracket 34 that vibrates integrally with track member 35 is measured in advance.

In the lock determination processing, feeder management device 80 determines whether the lock of track member 35 with respect to bracket 34 is suitable by comparing the amplitude of bracket 34 measured by measurement section 81 with the amplitude at the normal time that has been measured in advance. This determination is made using the fact that, when track member 35 is not normally locked to bracket 34, the mass of the vibrating body decreases and the amplitude changes. Lock determination section 82 determines that the lock of track member 35 with respect to bracket 34 is normal when the difference in each amplitude is within the allowable range.

In addition, in the present embodiment, the configuration in which feeder management device 80 is incorporated in control device 20 of component mounter 10 has been described as an example. Meanwhile, a part or all of feeder management device 80 may be an external device of component mounter 10. For example, feeder management device 80 may be incorporated in component supply device 12 that mediates communication between feeder 122 provided in multiple slots 121 and control device 20.

In addition, feeder management device 80 may be incorporated in feeder control device 70 of bulk feeder 30 as a self-diagnosis function of bulk feeder 30. Further, feeder management device 80 may be incorporated in a host computer, a dedicated device, or the like that is communicably connected to component mounter 10. Either aspect exhibits the same effects as those of the embodiment.

8-3. Track Member 35

In the embodiment, track member 35 of bulk feeder 30 includes alignment member 353 having multiple cavities 354 formed therein. Meanwhile, a configuration may be adopted in which alignment member 353 is omitted. That is, in supply region As of track member 35, a recessed portion in which component 92 is dispersed at a position lower than the upper surface of conveyance path R, or a planar portion uniform with the upper surface of conveyance path R may be formed, so that component 92 is supplied in the bulk state. It should be noted that, from the viewpoint of improving the efficiency of the component supplying process or reducing the load of the image processing in the recognition processing of the supply state in supply region As, the configuration described in the embodiment is preferable.

REFERENCE SIGNS LIST

10: component mounter, 12: component supply device, 13: component transfer device, 20: control device, 30: bulk feeder, 31: feeder main body, 32: component case, 34: bracket, 35: track member, 40: excitation device, 41: support member, 42: piezoelectric element (vibrator), 43: vibration sensor, 44: power supply device, 60: lock unit, 61: pin (locking target member), 62: lock member, 621: hook main body, 622: hook portion, 63: spring (elastic member), 64: operation section, 65: holding section, 80: feeder management device, 81: measurement section, 82: lock determination section, 83: calibration section, 84: notification section, 91: substrate, 92: component, As: supply region, R: conveyance path

The invention claimed is:

1. A bulk feeder comprising:

a feeder main body;

a bracket provided to be vibratable with respect to the feeder main body;

a track member provided detachably with respect to the bracket and formed with a conveyance path through which multiple components are conveyed and a supply region that communicates with the conveyance path and opens upward to collect the multiple components;

an excitation device configured to apply vibration to the track member via the bracket so that the multiple components are conveyed along the conveyance path;

a locking target member provided in a first one of the track member and the bracket; and a lock member provided in a second one of the track member and the bracket and configured to switch between a locked state in which the lock member is locked to the locking target member to restrict a relative movement of the track member with respect to the bracket, and a released state in which lock between the lock member and the locking target member is released, wherein the locking target member is a pair of pins protruding in a width direction and a horizontal direction of the feeder main body and provided at positions different from each other in a front-rear direction of the feeder main body.

2. The bulk feeder according to claim 1, wherein the lock member includes a hook main body provided to be slidable in the front-rear direction of the feeder main body, and a pair of hook portions respectively provided in the hook main body and moved to a first end side in a slide direction to be locked to the pair of pins.

3. The bulk feeder of claim 2, further comprising an elastic member configured to bias the hook main body with respect to the feeder main body in a direction in which the pair of hook portions is locked to the pair of pins.

4. The bulk feeder according to claim 3, further comprising an operation section configured to receive an operation force for switching between the locked state and the released state.

5. The bulk feeder according to claim 4, wherein a relative movement of the operation section in a front-rear direction with respect to the hook main body is restricted, and a relative movement of the operation section in an up-down direction with respect to the hook main body is permitted, and the bulk feeder further comprises a holding section configured to maintain the released state by holding the operation section that has moved downward with respect to the hook main body by a downward operation force in a state in which the hook main body is slid against a biasing force of the elastic member by the operation force with respect to the operation section and is switched to the released state.

6. A feeder management device for the bulk feeder according to claim 1, the feeder management device comprising:

a measurement section configured to measure a frequency or an amplitude of vibration of the bracket when the excitation device excites the track member; and a lock determination section configured to determine whether lock of the track member with respect to the bracket is suitable based on a result measured by the measurement section.

7. A feeder management device for a bulk feeder, in which the bulk feeder includes a feeder main body, a bracket provided to be vibratable with respect to the feeder main body, a track member provided detachably with respect to the bracket and formed with a conveyance path through which multiple components are conveyed and a supply region that communicates with the conveyance path and opens upward to collect the multiple components, and an excitation device configured to apply vibration to the track member via the bracket so that the multiple components are conveyed along the conveyance path, the feeder management device comprising:

a measurement section configured to measure a frequency or an amplitude of vibration of the bracket when the excitation device excites the track member; and a lock determination section configured to determine whether lock of the track member with respect to the bracket is suitable based on a result measured by the measurement section.

8. The feeder management device according to claim 7, wherein the measurement section measures the frequency of the vibration of the bracket, and the lock determination section determines that the lock of the track member with respect to the bracket is unsuitable when a difference between a natural frequency when the bracket and the track member vibrate integrally by the vibration of the excitation device and the result measured by the measurement section is outside an allowable range set in advance.

9. The feeder management device according to claim 7, wherein the excitation device includes a support member configured to support the bracket, and a vibrator provided in the support member and vibrating in accordance with supplied power, and the feeder management device further comprises a calibration section configured to adjust the supplied power to the vibrator based on the result measured by the measurement section in a state in which the track member is locked to the bracket, and acquire the supplied power to the vibrator when the bracket and the track member vibrate integrally at a natural frequency.

10. The feeder management device according to claim 7, further comprising a notification section configured to notify an operator when the lock determination section determines that the lock of the track member with respect to the bracket is unsuitable.

* * * * *